United States Patent
Gierer et al.

(10) Patent No.: US 6,261,204 B1
(45) Date of Patent: Jul. 17, 2001

(54) METHOD FOR ADAPTATION OF PRESSURE OF AN OVERLAPPING UPSHIFTING

(75) Inventors: Georg Gierer; Christian Popp, both of Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/508,565

(22) PCT Filed: Oct. 5, 1998

(86) PCT No.: PCT/EP98/06314

§ 371 Date: Mar. 13, 2000

§ 102(e) Date: Mar. 13, 2000

(87) PCT Pub. No.: WO99/18372

PCT Pub. Date: Apr. 15, 1999

(30) Foreign Application Priority Data

Oct. 6, 1997 (DE) .............................. 197 44 100

(51) Int. Cl.⁷ .................................................. F16H 61/26
(52) U.S. Cl. ........................ 477/156; 477/110; 477/154
(58) Field of Search ................... 74/335, 336 R; 477/154, 156, 148, 144, 143, 110; 701/51, 55

(56) References Cited

U.S. PATENT DOCUMENTS

| | | | |
|---|---|---|---|
| 4,928,235 | 5/1990 | Mehta et al. | 364/424.1 |
| 5,319,963 | 6/1994 | Benford | 73/118.1 |
| 5,609,068 | * 3/1997 | Gruhle et al. | 74/336 R |
| 5,795,262 | * 8/1998 | Robinson | 477/92 |
| 5,911,648 | * 6/1999 | Dreibholz et al. | 477/154 |

FOREIGN PATENT DOCUMENTS

| | | |
|---|---|---|
| 39 22 051 C2 | 1/1991 | (DE) . |
| 39 28 814 A1 | 3/1991 | (DE) . |
| 42 40 621 A1 | 6/1994 | (DE) . |
| 195 44 940 A1 | 1/1995 | (DE) . |
| 196 03 617 A1 | 1/1996 | (DE) . |
| 195 11 897 A1 | 10/1996 | (DE) . |
| 196 12 893 A1 | 10/1996 | (DE) . |
| 196 12 928 A1 | 10/1996 | (DE) . |
| 195 31 675 A1 | 3/1997 | (DE) . |
| 195 45 588 | 6/1997 | (DE) . |
| 0482 691 | 4/1992 | (EP) . |
| 07 50 139 A2 | 12/1996 | (EP) . |
| 07 83 079 A1 | 7/1997 | (EP) . |
| 96/01961 A1 | 1/1996 | (WO) . |
| 96/17189 A1 | 6/1996 | (WO) . |

\* cited by examiner

*Primary Examiner*—Sherry Estremsky
*Assistant Examiner*—Tisha D. Lewis
(74) *Attorney, Agent, or Firm*—Davis & Bujold, P.L.L.C.

(57) ABSTRACT

A method for pressure adaptation is proposed for an automatic transmission. The gear shifts here are carried out as overlapping gear shifts with a first opening (K1) and a second closing (K2) clutch, the overlapping gear shift consisting of a first and a second phase. During the first phase, a banking of the transmission input rotational speed (nT) is adjusted. The invention proposes that upon issuance of the shift command, a time period (t2) is determined until the transmission input rotational speed has reached the banking value (dn). This is compared with a predetermined time (tAD) during which a difference is obtained which provided with a sign is totaled in a summation memory. An adaptation value is stored in a correction value memory when the summation memory exceeds a limit value. As consequence of this, the disconnection pressure level (pAB) of the first clutch (K1) is adapted in subsequent gear shifts.

7 Claims, 6 Drawing Sheets

| Clutch - Logic | | | | | | | | |
|---|---|---|---|---|---|---|---|---|
| POS/GEAR | Clutch | | | | | | | Free Wheel |
|  | A | B | C | D | E | F | G | 1. G. |
| R = R-Gear |  | * |  | * |  |  | * |  |
| N = Neutral |  |  |  |  |  | * | * |  |
| D,1. Gear | * |  |  |  |  |  | * | * |
| D,2. Gear | * |  | * |  |  |  | * |  |
| D,3. Gear | * |  | * |  |  | * |  |  |
| D,4. Gear | * |  |  |  | * | * |  |  |
| D,5. Gear |  |  | * |  | * | * |  |  |
| 1,1. Gear | * |  |  | * |  |  | * | * |

\* - active

Fig. 2

METHOD FOR ADAPTATION OF PRESSURE OF AN OVERLAPPING UPSHIFTING

BACKGROUND OF THE INVENTION

The invention relates to a method for adaptation of pressure of an overlapping upshift in an automatic transmission having a first opening and a second closing clutch. The overlapping shift comprises two phases. During the first phase, banking the transmission input rotational speed is adjusted by regulating the pressure level of the first clutch. During the second phase, the second clutch takes over the load from the first clutch.

In electrohydraulically controlled automatic transmission, the gear shifts can be carried out as overlapping gear shifts. The applicant's application DE-OS 42 40 621 thus proposes a control and regulation method for an overlapping gear shift. The overlapping gear shift consists here of a first phase during which banking the transmission input rotational speed is adjusted and a second phase during which the actual take-over of the load takes place. Rotational speed banking means that, via the pressure level of the first clutch, a increased transmission input rotational speed is adjusted such as would result from the reduction ratio at the start of the upshift. The load take over, i.e. the moment at which the second clutch begins to take over the load from the first clutch, is when the banking of rotational speed again decreases. The above described method has recommended itself in the practice. However, some drivers find the length of time of the first phase is too long, i.e. the banking adjustment of the transmission input rotational speed takes too long.

SUMMARY OF THE INVENTION

Departing from the above described prior art, the problem on which the invention is based is to increase the spontaneity of the automatic transmission.

A first solution of the problem consists in measuring the time elapsed from issuance of the shift command until the transmission input rotational speed has reached the banked rotational speed. This is then compared with a predetermined time while calculating a difference value and totaling in a summation memory the difference value to which a sign is given. If the value of the summation memory exceeds a limit value, an adaptation value is stored in a correction memory so that the disconnection pressure level of the first clutch, i.e. the opening thereof, is adjusted in subsequent gear shifts.

A second solution of the problem consists in the presence of the adjustment criteria realized in the first solution, of adjusting the disconnection moment of the first clutch, i.e. the opening moment thereof, is adjusted in subsequent gear shifts.

In development of the first and also of the second solution, it is proposed that both the summation memory and the correction memory be divided into transmission input torque, temperature and rotational speed classes. For the rotational speed classes can be used both the transmission input and the transmission output rotational speeds. The inventive solution and the development thereof offer the advantage that the transmission input rotational speed be adjusted to the banking value more quickly, since here the adapted value is used as command variable of the closed loop control. A shorter regulation phase results herefrom. The reaction of the automatic transmission is thus more closely linked to the driver's behavior, thereby acting more spontaneously.

Other advantageous developments are contained in the subclaims wherein, according to claim 7, the gear shift for the adjustment is not evaluated when prior to start of the second phase, one of the following conditions is present: throttle valve value less than a limit value, or gradient of the throttle valve more than a limit value, or coasting operation is detected, or shift command is detected via selector lever, or the temperature of the ATF (automatic transmission fluid) is below a limit value.

BRIEF DESCRIPTION OF THE DRAWINGS

In the drawings is shown an embodiment wherein:

FIG. 2 is a clutch logic table;

DESCRIPTION OF THE PREFERRED EMBODIMENTS

Figure 1:
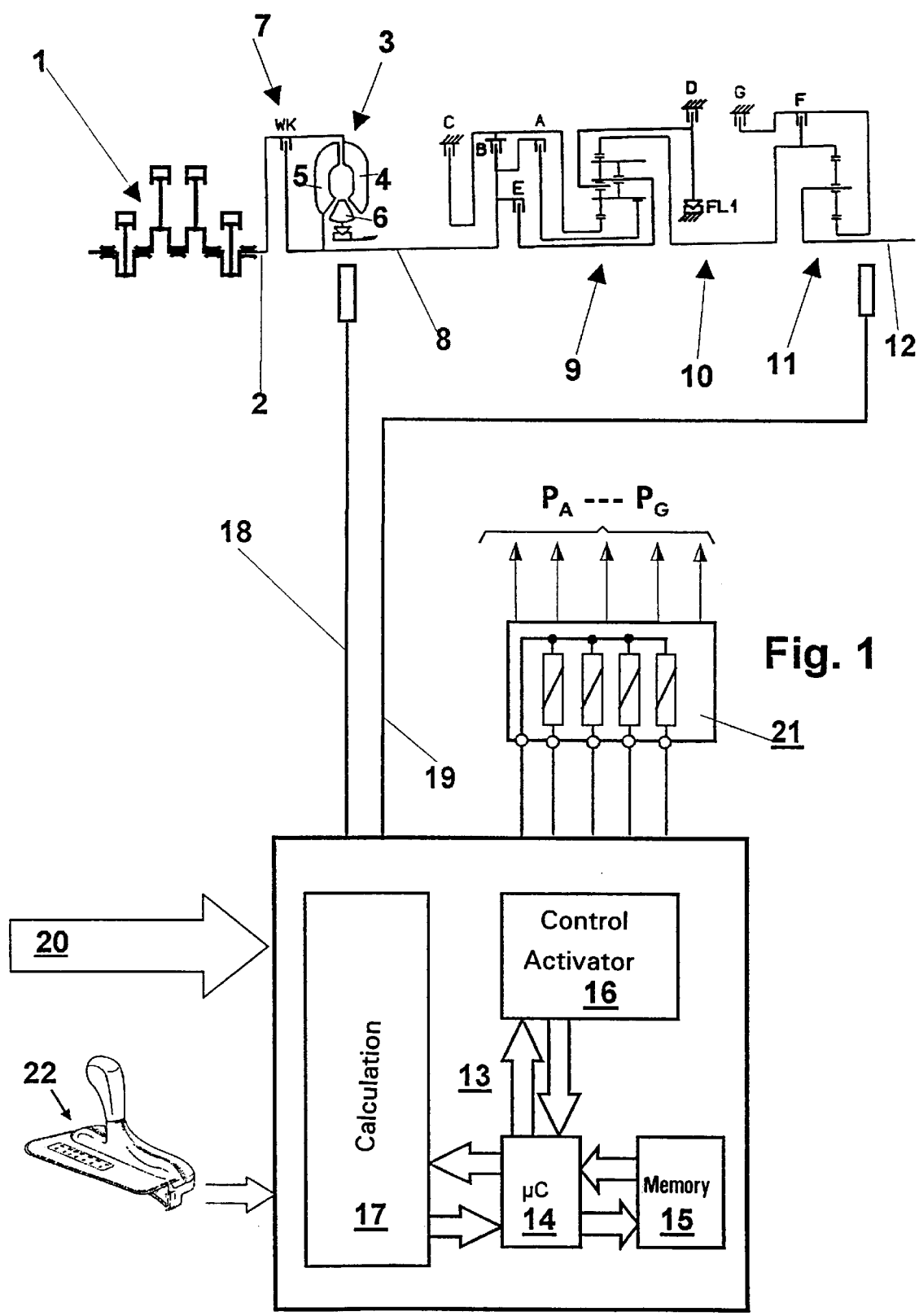
FIG. 1 is a system diagram.

FIG. 1 shows a system diagram of an automatic transmission. It consists of the mechanical part, a hydrodynamic converter 3, a hydraulic control unit 21 and an electronic gear control 13. The automatic transmission is driven by a drive unit 1, preferably an internal combustion engine, via an input shaft 2, non-rotatably connected with the impeller 4 of the hydrodynamic converter 3. As known per se, the hydrodynamic converter 3 consists of an impeller 4, a turbine wheel 5 and a stator 6. A converter clutch 7 is disposed parallel with the hydrodynamic converter 3. The converter clutch 7 and the turbine wheel 5 lead to a turbine shaft 8. When the converter clutch 7 is actuated, the turbine shaft 8 has the same rotational speed as the input shaft 2. The mechanical part of the automatic transmission consists of clutches and brakes A to G, a free wheel 10 (FL1), a Ravigneaux set 9 and a rear-mounted planetary gear set 11. The output occurs via a transmission output shaft 12. The latter leads to a differential, not shown which, via two axle half shafts, drives the output of a vehicle, not shown. A gear step is established via a clutch/brake combination. The coordination of the clutch logic with the gear step can be seen in FIG. 2. Thus, e.g. when changing down from the fourth to the third gear, the brake C becomes closed and the clutch E is deactivated. As can further be seen from table 2, the gear shifts from the second up to the fifth ratio step are each carried out as overlapping gear shifts. Since the mechanical part is not relevant for further understanding of the invention, a detailed description is omitted.

The electronic gear control 13 selects a corresponding gear step according to input variables 20 and to the selector lever 22. Via th hydraulic control unit 21 where electromagnetic actuators are located, the electronic gear control 13 then activates a corresponding clutch/brake combination. During the change of gear, the electronic gear control 13 determines the pressure curve of the clutches/brakes taking part in the gear shift. Of the electronic gear control 13, there are shown as blocks in extensively simplified form: microcontroller 14, memory 15, function block control actuates 16 and function block calculation 17. In the memory 15 are stored the data relevant to the transmission. Data relevant to the transmission are, e.g. programs, characteristic values specific to the vehicle and also diagnosis data and adaptation values. The memory 15 is usually designed as EPROM, EEPROM or as buffered RAM. In the function block 17, the data are calculated relevant for a gear shift curve. The function block control actuators 16 serves for control of the actuators located in the hydraulic control unit 21. The input variables 20 fed to the electronic gear control 13 are, e.g. a variable representative of the driver's desired performance, such as the accelerator pedal/throttle valve position or manual gear shift requirements, the signal of the torque generated by the internal combustion engine, the rotational speed and temperature of the internal combustion engine, etc. The specific data of the internal combustion engine are usually provided by an engine control unit. This is not shown in FIG. 1. As added input variables the electronic gear control 13 receives the rotational speed of the turbine shaft 18 (nT) and of the transmission output shaft 19 (nAB).

Figure 3A:
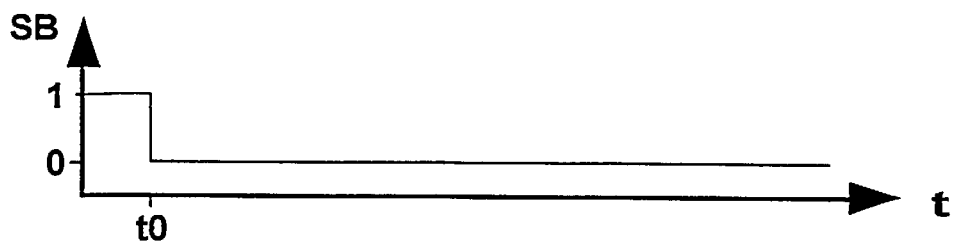
FIG. 3 is a time diagram of the first solution.
Figure 3B:
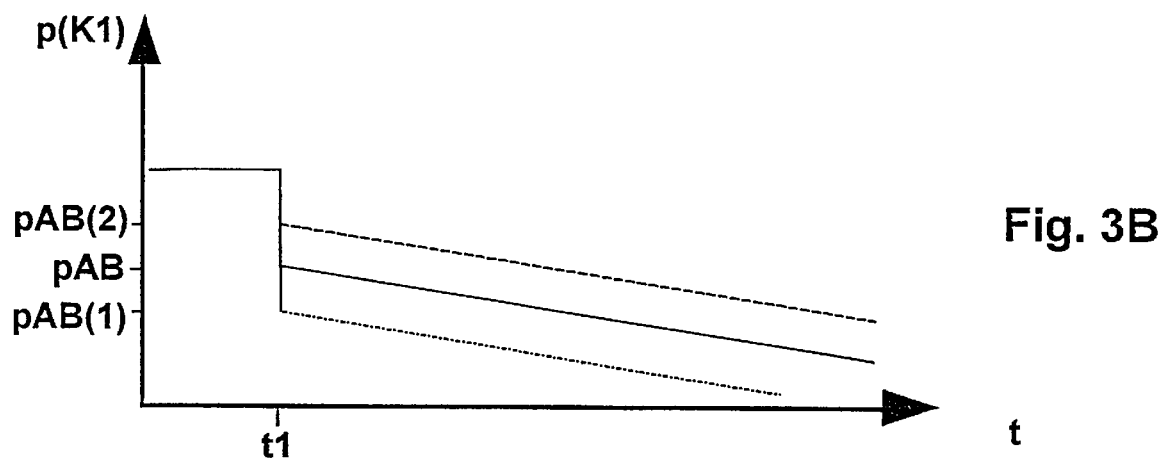
Figure 3C:
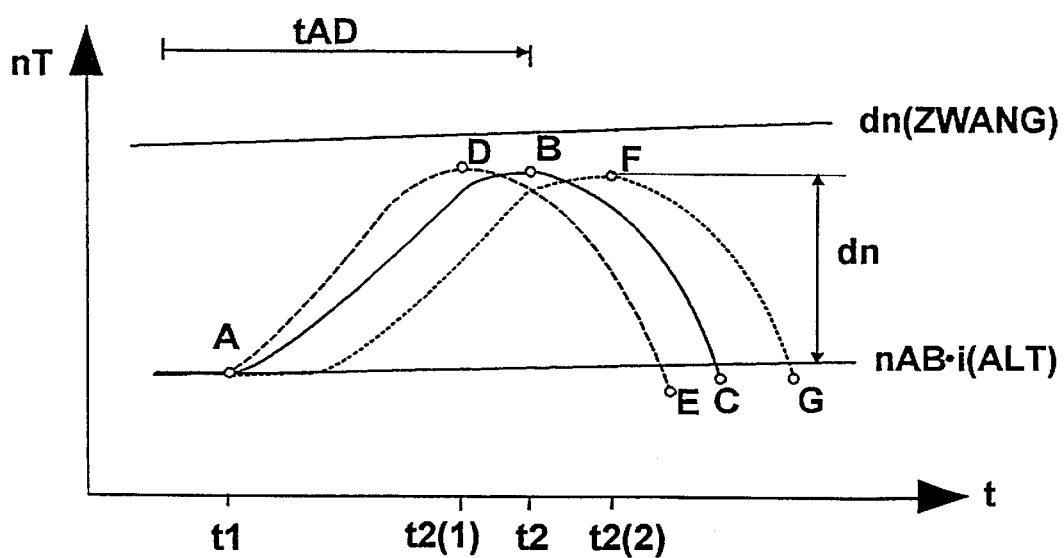

FIG. 3 shows the first inventive solution consisting of the parts FIG. 3A to 3C. FIGS. 3A, 3B and 3C, respectively, show in the course of time the shift command, the pressure curve of the first, i.e. the disconnecting clutch K1, and the curve of the transmission input rotational speed nT for three case examples during the first phase of the overlapping shift. The curve path with the points A, B and C corresponds to the ideal curve. The curve path with the points A, D and E corresponds to a transmission input rotational speed curve which results too quickly from the point of view of time. The curve path with the points A, F and G corresponds to a curve that results too late from the point of view of time. The rotational speed value of the points D, B and F is raised by the amount dn in comparison with the rotational speed value that would result from the transmission output rotational speed nAB and the old reduction ratio i(ALT). Such a method of adjusting a rotational speed increase during the overlapping shift is known from DE-OS 42 40 621 which belongs with the disclosure of this application. At the t0 moment the electronic gear control 13 issues the shift command. After lapse of a delay time resulting from the signal running time periods, at the t1 moment occurs a reduction of the pressure level of the first clutch K1 to the disconnection pressure level pAB. Thereafter a negative pressure ramp results for the first clutch K1. As consequence of the negative pressure ramp the transmission input rotational speed nT begins to bank at the t1 moment. At the t2 moment, it has reached its maximum value or was adjusted by the regulator on the basis of that. The maximum value results from the transmission output rotational speed nAB multiplied by the original reduction ratio i(ALT) plus the banking value dn. The t2 moment, i.e. in point B, is to be regarded as termination of the first phase. Thereafter follows the second phase during which the second clutch takes over the load from the first clutch so that the rotational speed banking dn decreases and the transmission input rotational speed nT changes in direction of the new synchronization point. If the disconnection pressure level of the first clutch is above an increased value pAB(2), the regulator needs a long period of time in order to adjust the rotational speed banking. Herefrom results the curve with the points A and F. If the disconnection pressure level of the first clutch is above a pressure level pAB(1) that is too low, then as reaction to this the transmission input rotational speed begins to rise too quickly, this corresponds in FIG. 3C to the curve path with the points A and D.

The inventive solution proposes that at the t0 moment, i.e. with the disconnection command, a period of time begins to run, the end of which is determined when the transmission input rotational speed nT has reached the banking value dn. This period of time is compared with a predetermined period of time tAD obtaining a difference, that is DIFF=tAD−t2. The time period tAD corresponds here to the ideal value and terminates at point B, i.e. at the t2 moment. The difference is totaled and given a sign in a summation memory SUM (DIFF). In case the transmission input rotational speed nT has reached the banking value in the point F, i.e. at the t2(2) moment, there thus results a negative difference. In the other case, when the transmission input rotational speed nT has reached the banking value dn too early, i.e. at the t2(1) moment, a positive difference results. If the content of the summation memory SUM(DIFF) exceeds a limit value ±GW, an adaptation value dp is stored in a correction memory KORR. The total SUM(DIFF) and the correction memory KORR are divided in transmission input torque Mt, temperature C(ATF) and rotational speed nT classes. It thus applies:

SUM(DIFF)=f Mt, C(ATF), nT); and

KORR=f Mt, C(ATF), respectively.

The adaptation value dp causes the disconnection pressure level pAB of the first clutch to become adapted in the subsequent gear shifts, it thus applies: pAB=pAB±dp.

In FIG. 3C is additionally plotted a line dn (ZWANG). If the transmission input rotational speed nT exceeds the rotational speed value dn(ZWANG), the correction value memory KORR becomes tied up together with a fixed value dp2.

Figure 4:
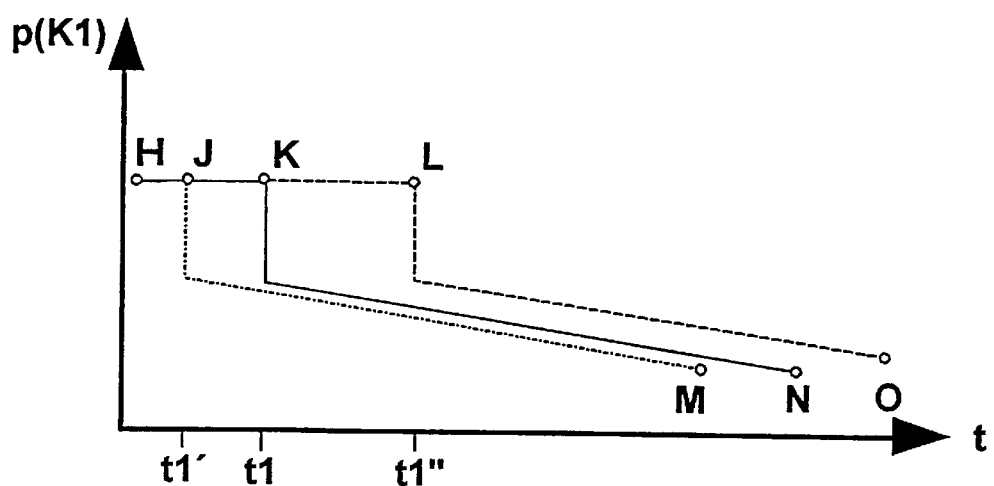
FIG. 4 is a time diagram of the second solution.

In FIG. 4 is shown the second solution of the problem. On the basis of the transmission input rotational speed curves shown in FIG. 3C, the disconnection moment of the first clutch K1 is changed as consequent reaction when the adaptation criteria have been satisfied. The t1 moment here corresponds to the ideal properties, curve path H, K and N, corresponding to the transmission input rotational speed curve with the points A, B and C. The disconnection point t1' with the curve path H, J and M applies as consequent reaction for a transmission input rotational speed curve which results too late from the point of view of time. This corresponds in FIG. 3C to the curve with the points A, F and G. The t1" moment with the curve path H, L and O results as consequent reaction for a transmission input rotational speed curve which results too early from the point of view of time. This corresponds in FIG. 3C to the curve path with the points A, D and E.

Figure 5:
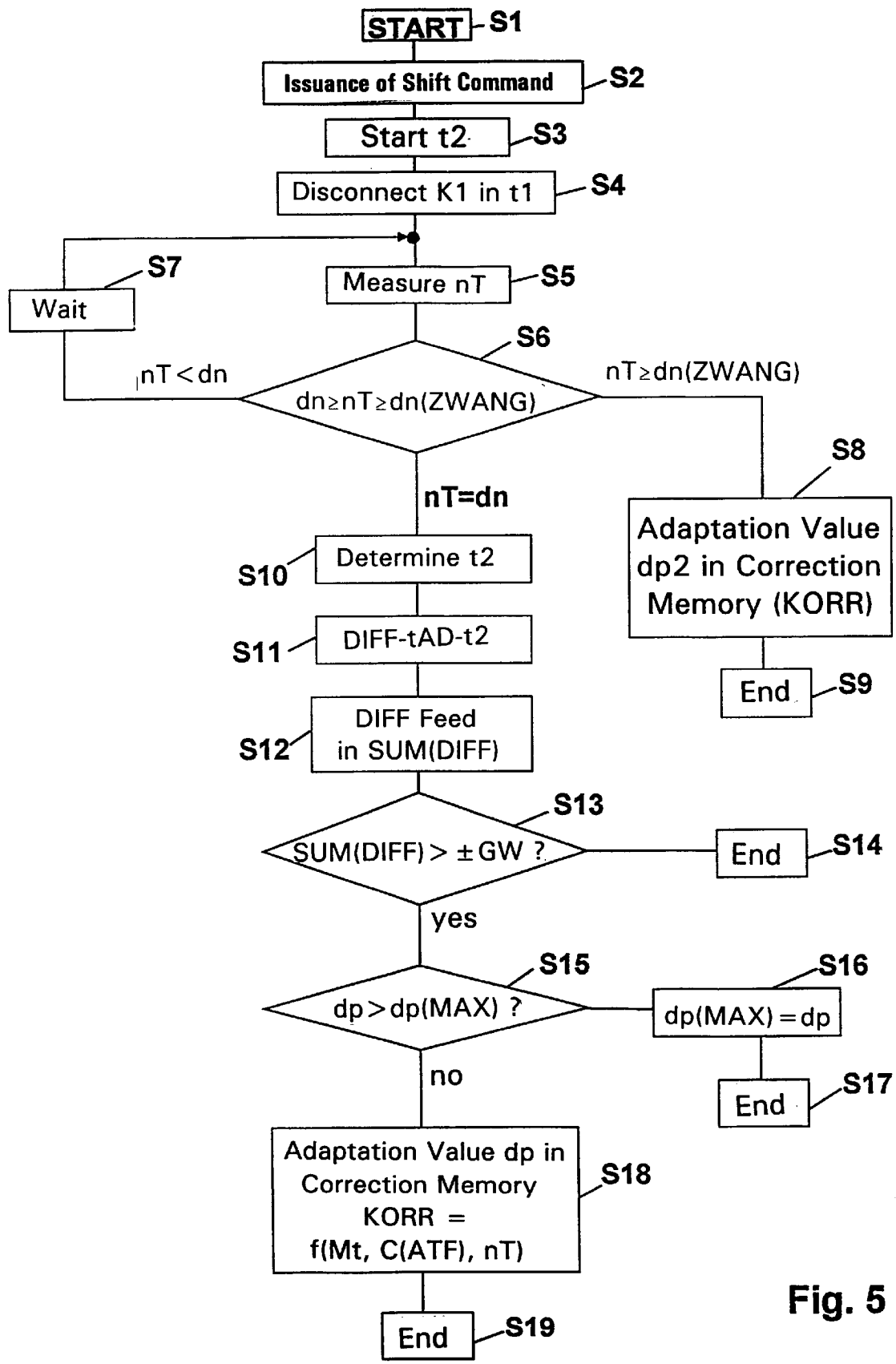
FIG. 5 is a program flow chart of the first solution.

FIG. 5 shows a program flow chart of the first solution. It begins in step S1 with the start, i.e. the finding that an upshift is needed. In step S3, the electronic gear control 13 issues the shift command. Simultaneously, the time step t2 is started in step S3. In step S4, the clutch K1 is disconnected in t1. In step S5, the actual transmission input rotational speed value nT is measured. In step S6 is tested whether the transmission input rotational speed nT is less than or equal to the banking value dn or more than or equal to the rotational speed of the Zwang adaptation banking dn(ZWANG). In case the transmission input rotational speed is lower than the banking value dn, a holding pattern is traversed with step S7. In case the transmission input rotational speed is higher than or equal to the rotational speed of the Zwang adaptation banking dn(ZWANG), in step S8 an adaptation value dp2 is stored in the correction memory KORR and with step S9 the adaptation program is terminated. If the test in step S6 results in the transmission input rotational speed nT being equal to the banking value dn, the time period t2 elapsed for this since the t0 moment is determined in step S10. In step S11 is obtained then the difference from two time values tAD−t2, tAD corresponding to a predetermined time (theoretical value). In step S12, the difference provided with a sign is stored in the summation memory SUM(DIFF). Thereafter follows in step S13 the inquiry whether the content of the summation memory SUM(DIFF) is above a limit value ±GW. If this is not the case, in step S14, the adaptation program is abandoned. If the inquiry in step S13 results in that the limit value ±GW has been exceeded, it is additionally tested in step S15 whether the adaptation value dp thus calculated is above a maximum value dp (MAX). If this is the case, then in step S16, the adaptation value dp is limited to the maximum value dp(MAX) and thereafter with step S17 the adaptation program is abandoned. If the test in step S15 results in that the adaptation value dp is less than the maximum value dp(MAX), then in step S18 the adaptation value dp is stored in the correction memory KORR. The correction memory KORR, the same as the summation memory SUM(DIFF), have here the transmission input torque Mt, temperature C(ATF) and rotational speed nT classes. Thereafter follows in step S19 the end of the adaptation program.

In a simple model, the correction and also the summation memories can represent only a relationship of transmission input torque Mt and temperature and be implemented as follows:

|       | C1 (ATF) | C2 (ATF) | C3 (ATF) |
|-------|----------|----------|----------|
| Temp 1 | Value 1 | Value 4 | Value 7 |
| Temp 2 | Value 2 | Value 5 | Value 8 |
| Temp 3 | Value 3 | Value 6 | Value 9 |

Values (i), i.e. value 1 to value 9 here, mean:
in the summation memory the total sum of the time difference values tAD–t2; and
in the correction memory values of the disconnection pressure level pAB of the first clutch.

Figure 6:
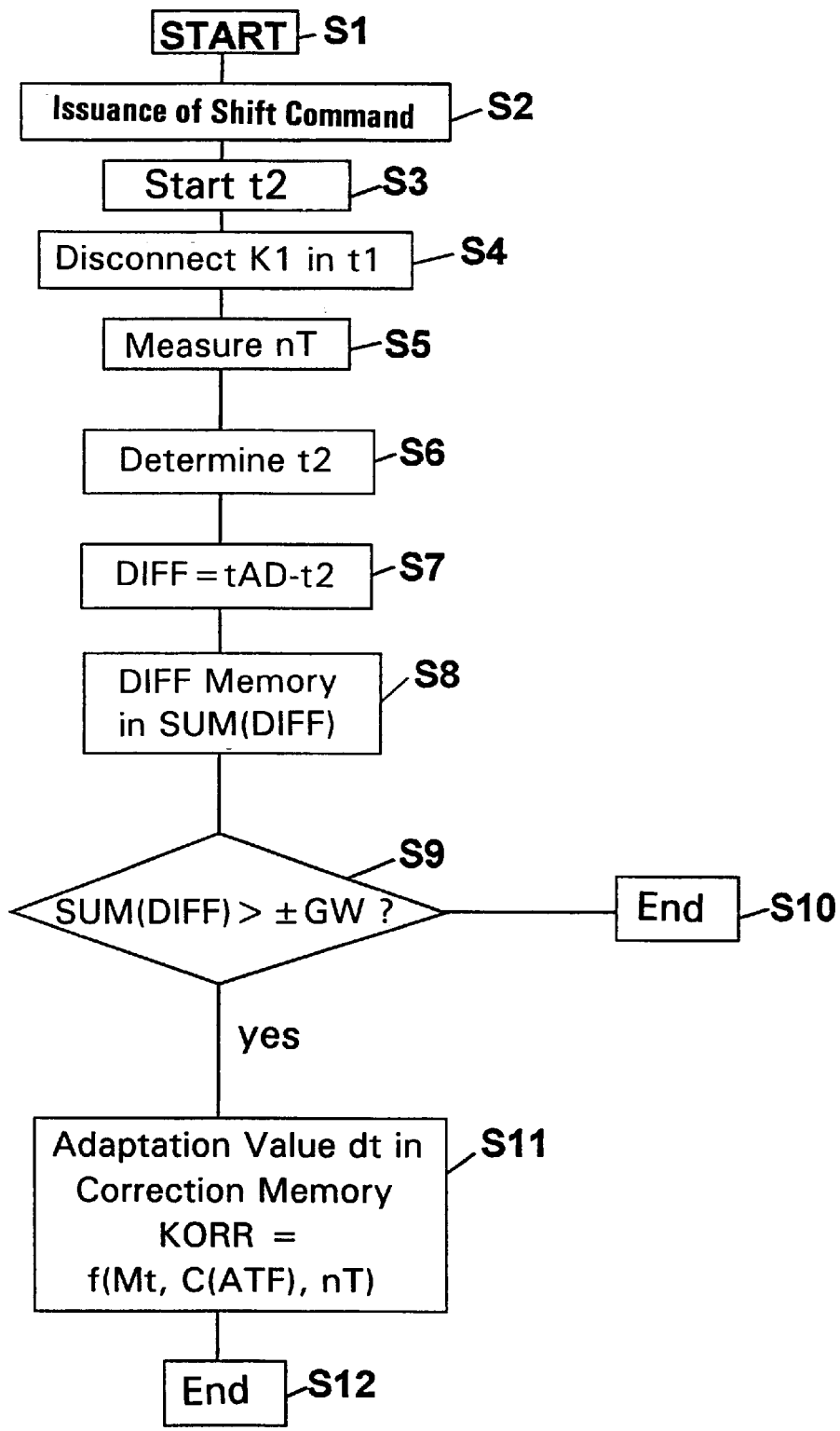
FIG. 6 is a program flow chart of the second solution.

The second inventive solution is shown in FIG. 6. The sequence up to step S5 is identical with the sequence in FIG. 4 so that what has been described there applies here. In step S6, the t2 time is determined. The t2 time has been reached when the transmission input rotational speed nT has reached the banking value dn. In step S7 is then determined the difference from the predetermined time tAD minus the measured time t2. In step S8, the difference is stored in the summation memory SUM(DIFF). In step S9 is tested whether the content of the summation memory is above the limit value ±GW. If this is not the case, the sequence branches off to step S10 and the adaptation program is terminated. If the content of the summation memory SUM (DIFF) is above the limit value ±GW, then in step S11 an adaptation value dt is stored in the correction memory KORR. What has been described in FIG. 4 applies to the structure of the summation memory and of the correction memory. Thereafter the adaptation program is abandoned in step S12.

1 input unit
2 input shaft
3 hydrodynamic converter
4 impeller
5 turbine wheel
6 stator
7 converter clutch
8 turbine shaft
9 Ravigneaux set
10 free wheel FL1
11 planetary gear set
12 transmission output shaft
13 electronic tear control
14 micro-controller
15 memory
16 function block control actuators
17 function block calculation
18 turbine rotational speed signal
19 transmission output rotational speed signal
20 input variables
21 hydraulic control unit
22 selector lever

What is claimed is:

1. A method for adjustment of an overlapping upshift in an automatic transmission having a first opening clutch K1) and a second closing clutch (K2), the overlapping gear shift comprising two phases wherein during the first phase banking (dn) of transmission input rotational speed (nT) is adjusted by regulating the pressure level of said first clutch (K1) and during the second phase the second clutch (K2) takes over the load from said first clutch (K1), wherein upon issuance of the shift command the time period (t2) until the transmission input rotational speed (nT) has reached the banked rotational speed banking (dn) is detected, this is compared with a predetermined time (tAD) to obtain a difference (DIFF) (DIFF=tAD–t2), the difference provided with a sign is totaled in a summation memory (SUM DIFF)) and an adaptation value (dp) is stored in a correction value memory (KORR) when the summation memory (SUM (DIFF)) exceeds a limit value (±GW) so that pressure level (pAB) of disconnection of said first clutch (K1) is adjusted for the subsequent gear shifts (pAB=pAB±dp).

2. The method according to claim 1, wherein upon issuance of the shift command the time period (t2) until the transmission input rotational speed (nT) has reached the rotational banked speed (dn) is detected, this is compared with a predetermined time (tAD) obtaining a difference (DIFF) (DIFF=tAD–t2), the difference provided with a sign is totaled in a summation memory (SUM(DIFF)), an adjustment value (dt) is stored in a correction value memory (KORR) when the summation memory (SUM(DIFF)) exceeds a limit value (±GW) so that the moment (t1) the disconnection command is issued is adjusted in the subsequent gear shifts.

3. The method for adaptation according to claim 1, wherein both the summation memory (SUM(DIFF)) and the correction value memory (KORR) are divided in transmission input torque (Mt), temperature (C(ATF)) and rotational speed (nT) classes (SUM(DIFF))=f (Mt, C(ATF), nT) and KORR=f (Mt, C(ATF), nT), respectively.

4. The method for adaptation according to claim 1, wherein when the transmission input rotational speed (nT) exceeds a rotational speed of a Zwang adaptation (dn (ZWANG)), the correction value memory (KORR) is altogether covered with a fixed value (dp2) in all transmission input torque (Mt), temperature (C(ATF)) and rotational speed (nT) classes.

5. The method for adaptation according to claim 1, wherein the gear shift for adjustment is not evaluated when at least one of the conditions that follow apply prior to start of the second phase throttle valve value (DKI) is less than a limit value (DKI<GW),
gradient of the throttle valve (Grad(DKI)) is more than a limit value (GRAD(DKI)>GW),
coasting detected,
shift command detected via selector lever,
temperature of the ATF (C(ATF)) less than a limit value (GW) (C(ATF)<GW).

6. The method for adaptation according to claim 3, wherein the predetermined time (tAD) is additionally a function of the upshift type (HS) (tAD=f (HS)).

7. The method for adaptation according to claim 6, wherein the adaptation value (dp) does not exceed a maximum value (dp(MAX)).

* * * * *